United States Patent
Seo et al.

(10) Patent No.: US 10,649,251 B2
(45) Date of Patent: May 12, 2020

(54) CURVED LIQUID CRYSTAL DISPLAY DEVICE AND METHOD OF MANUFACTURING THE SAME

(71) Applicant: SAMSUNG DISPLAY CO., LTD., Yongin-si, Gyeonggi-do (KR)

(72) Inventors: O Sung Seo, Seoul (KR); Hyun-Ho Kang, Ansan-si (KR); Young Goo Song, Asan-si (KR); Seung Jun Yu, Cheonan-si (KR); Ha Won Yu, Suwon-si (KR); Ki Kyung Youk, Bucheon-si (KR); Sang-Myoung Lee, Seoul (KR); Tae Kyung Yim, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/923,284

(22) Filed: Oct. 26, 2015

(65) Prior Publication Data

US 2016/0202535 A1 Jul. 14, 2016

(30) Foreign Application Priority Data

Jan. 12, 2015 (KR) .................. 10-2015-0004212

(51) Int. Cl.
*G02F 1/1333* (2006.01)
*G02F 1/1337* (2006.01)

(52) U.S. Cl.
CPC .. *G02F 1/133305* (2013.01); *G02F 1/133707* (2013.01); *G02F 2001/133354* (2013.01)

(58) Field of Classification Search
CPC ........... G02F 1/133516; G02F 1/13439; G02F 2001/133354; G02F 1/134309; G02F 2201/56; G02F 1/133707; G02F 2001/134318; H01L 33/20

See application file for complete search history.

(56) References Cited

U.S. PATENT DOCUMENTS

| 2004/0070713 A1* | 4/2004 | Song ................ G02F 1/133707 349/129 |
| 2005/0036091 A1* | 2/2005 | Song ................ G02F 1/133707 349/129 |

(Continued)

FOREIGN PATENT DOCUMENTS

| KR | 10-2008-0071231 A | 8/2008 |
| KR | 10-0851743 B1 | 8/2008 |

(Continued)

*Primary Examiner* — Michael H Caley
*Assistant Examiner* — Mariam Qureshi
(74) *Attorney, Agent, or Firm* — Innovation Counsel LLP

(57) ABSTRACT

A method of manufacturing a curved liquid crystal display is provided. The method includes forming a first display panel including a plurality of first patterns, forming a second display panel including a plurality of second patterns, assembling the first display panel and the second display panel, filling a liquid crystal between the assembled first and second display panels to form a flat liquid crystal display, and curving the flat liquid crystal display in a first direction to form the curved liquid crystal display. The first patterns and the second patterns are mismatched in the flat liquid crystal display, and the first patterns and the second patterns are matched in the curved liquid crystal display.

11 Claims, 13 Drawing Sheets

(56) References Cited

U.S. PATENT DOCUMENTS

| | | | |
|---|---|---|---|
| 2007/0057297 A1* | 3/2007 | Kim | G02F 1/136213 257/291 |
| 2014/0063434 A1* | 3/2014 | Zhao | B23B 27/00 349/158 |
| 2014/0176856 A1* | 6/2014 | Lee | G02F 1/133305 349/61 |
| 2015/0370116 A1* | 12/2015 | Chae | G02F 1/13394 349/43 |
| 2016/0077384 A1* | 3/2016 | Yang | G02F 1/133723 349/128 |
| 2016/0116774 A1* | 4/2016 | Ma | G02F 1/1341 156/250 |
| 2016/0187709 A1* | 6/2016 | Lee | G02F 1/133308 349/58 |

FOREIGN PATENT DOCUMENTS

| | | |
|---|---|---|
| KR | 10-2011-0130177 A | 12/2011 |
| KR | 10-2012-0011294 A | 2/2012 |
| KR | 10-2014-0070750 A | 6/2014 |

\* cited by examiner

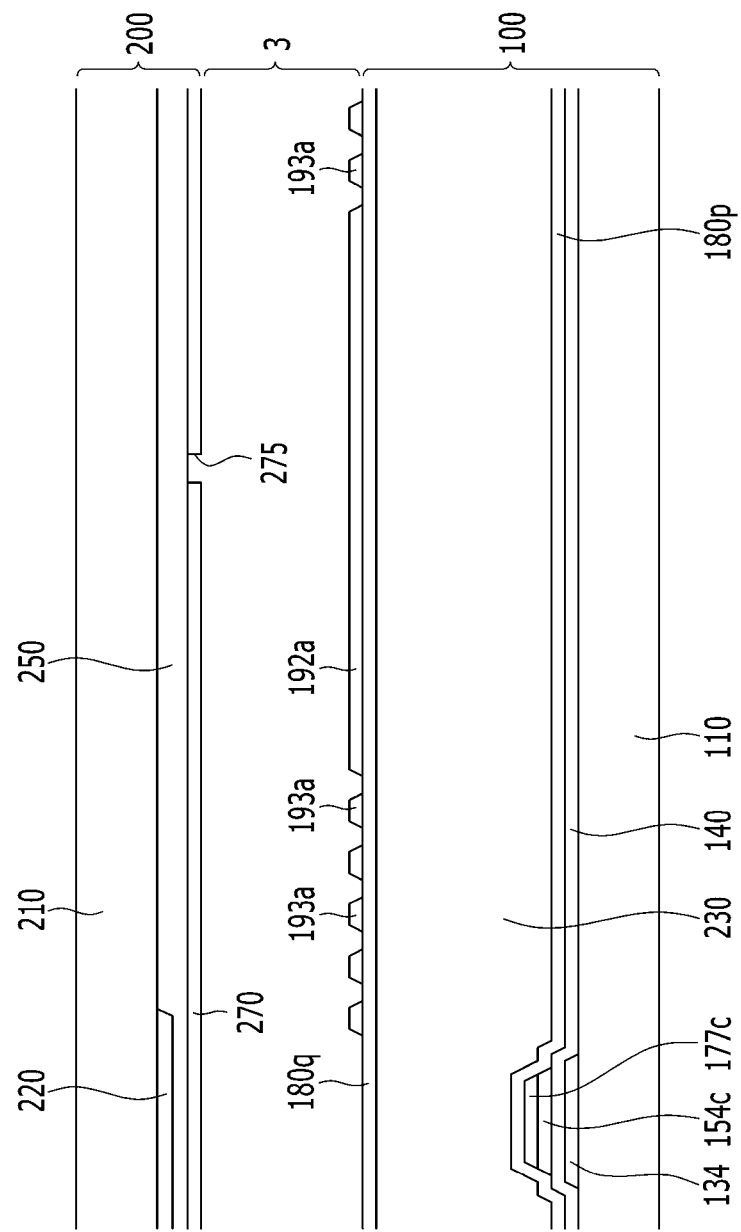

CURVED LIQUID CRYSTAL DISPLAY DEVICE AND METHOD OF MANUFACTURING THE SAME

CROSS-REFERENCE TO RELATED APPLICATION

This application claims priority to and the benefit of Korean Patent Application No. 10-2015-0004212 filed in the Korean Intellectual Property Office on Jan. 12, 2015, the entire contents of which are incorporated herein by reference.

BACKGROUND (a) Technical Field

The present disclosure generally relates to a curved liquid crystal display and a manufacturing method thereof.

(b) Description of the Related Art

A liquid crystal display (LCD) is one of the most common types of flat panel display currently in use. A liquid crystal display typically includes two sheets of display panels with field generating electrodes (such as a pixel electrode and a common electrode), and a liquid crystal layer interposed therebetween. An electric field is generated in the liquid crystal layer by applying voltages to the field generating electrodes. The electric field determines the direction of liquid crystal molecules in the liquid crystal layer, and controls polarization of incident light passing through the liquid crystal layer, so as to allow images to be displayed on the liquid crystal display.

The two display panels of the liquid crystal display may include a thin film transistor array panel and an opposing display panel. In the thin film transistor array panel, a gate line for transferring a gate signal and a data line for transferring a data signal are formed crossing each other. In addition, a thin film transistor connected with the gate line and the data line, a pixel electrode connected with the thin film transistor, and the like may be formed in the thin film transistor array panel. In the opposing display panel, a light blocking member, a color filter, a common electrode, and the like may be formed. In some cases, the light blocking member, the color filter, and the common electrode may be formed on the thin film transistor array panel instead of the opposing display panel.

Recently, a screen size of the liquid crystal display has increased. Also, large-screen curved liquid crystal displays have been developed to enhance a viewer's immersion experience. A curved liquid crystal display may be manufactured by forming constituent elements separately on the two display panels, assembling the two display panels to form a flat liquid crystal display, and curving the flat liquid crystal display. In some cases, the curving of the flat liquid crystal display may cause the constituent elements on the display panels to misalign, thereby resulting in mismatch between the constituent elements.

The above information disclosed in this Background section is to enhance understanding of the background of the inventive concept and therefore it may contain information that does not form the prior art that is already known in this country to a person of ordinary skill in the art.

SUMMARY

The present disclosure addresses at least the above issues relating to mismatch between constituent elements in a curved liquid crystal display.

According to an exemplary embodiment of the inventive concept, a method of manufacturing a curved liquid crystal display is provided. The method includes: forming a first display panel including a plurality of first patterns; forming a second display panel including a plurality of second patterns; assembling the first display panel and the second display panel; filling a liquid crystal between the assembled first and second display panels to form a flat liquid crystal display; and curving the flat liquid crystal display in a first direction to form the curved liquid crystal display, wherein the first patterns and the second patterns are mismatched in the flat liquid crystal display, and wherein the first patterns and the second patterns are matched in the curved liquid crystal display.

In some embodiments, the first patterns may include a pixel electrode, and the second patterns may include a common electrode having cutouts.

In some embodiments, the pixel electrode may include a partial plate electrode and a plurality of minute branch electrodes extending from the partial plate electrode, and the partial plate electrode may overlap with the cutouts of the common electrode when the flat liquid crystal display is curved in the first direction to form the curved liquid crystal display.

In some embodiments, the first patterns may include a thin film transistor, and the second patterns may include a light blocking member.

In some embodiments, the first patterns may include a color filter, and the second patterns may include a pixel electrode and a common electrode.

According to another exemplary embodiment of the inventive concept, a curved liquid crystal display is provided. The curved liquid crystal display includes: a first display panel including a plurality of first patterns; a second display panel including a plurality of second patterns facing the plurality of first patterns; and a liquid crystal layer positioned between the first display panel and the second display panel so as to form a flat liquid crystal display, wherein the first patterns and the second patterns are mismatched in the flat liquid crystal display, and wherein the first patterns and the second patterns are matched when the flat liquid crystal display is curved in a first direction to form the curved liquid crystal display.

In some embodiments, the first patterns may include a pixel electrode, and the second patterns may include a common electrode having cutouts.

In some embodiments, the pixel electrode may include a partial plate electrode and a plurality of minute branch electrodes extending from the partial plate electrode, and the partial plate electrode may overlap with the cutouts of the common electrode when the flat liquid crystal display is curved in the first direction to form the curved liquid crystal display.

In some embodiments, the first patterns may include a thin film transistor, and the second patterns may include a light blocking member.

In some embodiments, the first patterns may include a color filter, and the second patterns may include a pixel electrode and a common electrode.

In some embodiments, the first patterns and the second patterns may be mismatched having symmetry in the first direction.

BRIEF DESCRIPTION OF THE DRAWINGS

FIG. 13 is a cross-sectional view of the pixel of the curved liquid crystal display of FIG. 12 taken along line IV-IV.

DETAILED DESCRIPTION

Figure 1:
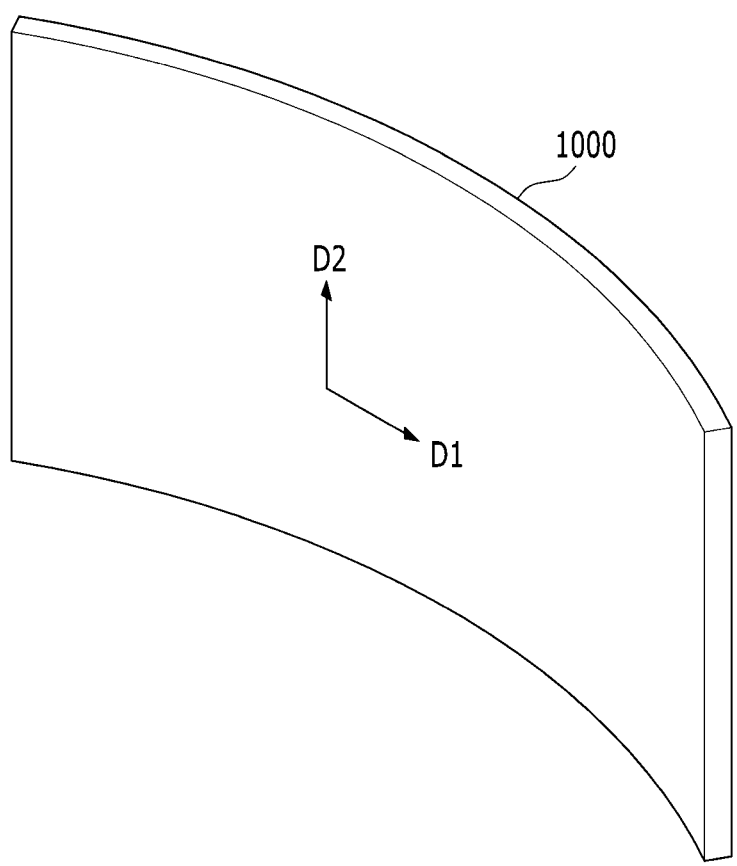
FIG. 1 is a perspective view of a curved liquid crystal display according to an exemplary embodiment.

The inventive concept will be described more fully herein with reference to the accompanying drawings, in which exemplary embodiments are illustrated. As those skilled in the art would realize, the embodiments may be modified in various ways without departing from the spirit or scope of the present disclosure.

In the drawings, the thicknesses of various layers and areas may be exaggerated for clarity. Like reference numerals designate like elements throughout the specification. It will be understood that when an element such as a layer, film, region, or substrate is described as being "on" another element, it can be directly on the other element, or with one or more intervening elements being present. In contrast, when an element is described as being "directly on" another element, there are no intervening elements present.

FIG. 1 is a perspective view of a curved liquid crystal display according to an exemplary embodiment.

Referring to FIG. 1, a curved liquid crystal display 1000 according to the exemplary embodiment has a predetermined curvature. The curved liquid crystal display 1000 is curved along a first direction D1. The curved liquid crystal display 1000 is manufactured by forming a flat liquid crystal display, and curving the flat liquid crystal display. For example, a force may be applied to the flat liquid crystal display in a predetermined direction to form a curved surface of the curved liquid crystal display 1000.

In the flat liquid crystal display, a plurality of pixels of the display device are positioned at different distances from a viewer's eyes. For example, distances from the viewer's eyes to pixels positioned at the center of the flat display may be larger than distances from the viewer's eyes to pixels positioned at the left and right edges of the flat display. In contrast, in the curved liquid crystal display 1000, when the center of a circle formed by extending the curved surface is positioned at the viewer's eyes, distances from the viewer's eyes to the plurality of pixels at the center and left/right edges of the curved display may be almost constant (i.e., equidistant to the pixels). Accordingly, the curved liquid crystal display 1000 has a wider viewing angle than the flat liquid crystal display, and more visual information may be transferred to the viewer's brain through optic nerves. Visual cells are stimulated by the larger amount of visual information and as a result, realism and view immersion experience can be further improved.

Figure 2:
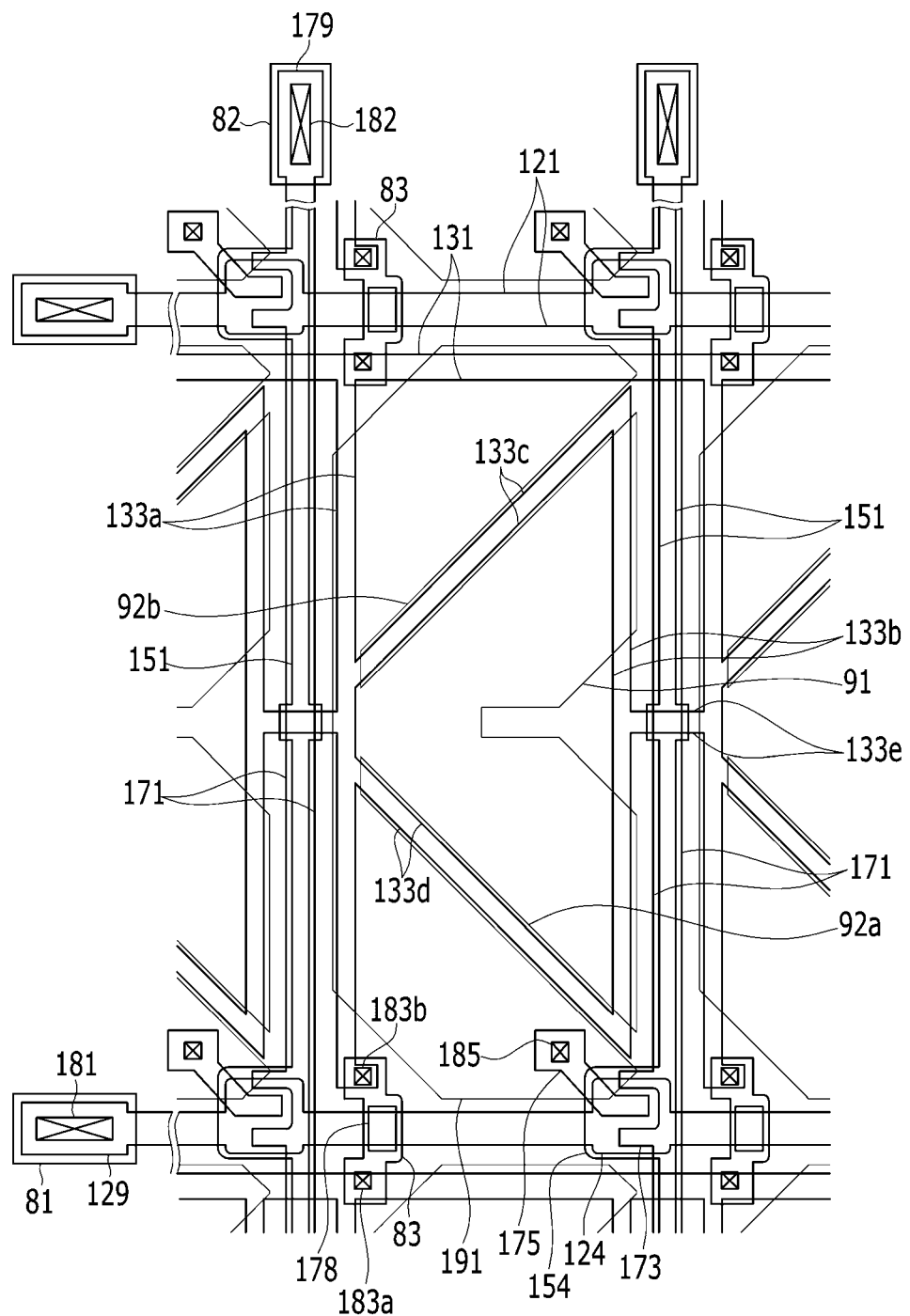
FIG. 2 is a layout view of a thin film transistor array panel for a curved liquid crystal display according to an exemplary embodiment.
Figure 3:
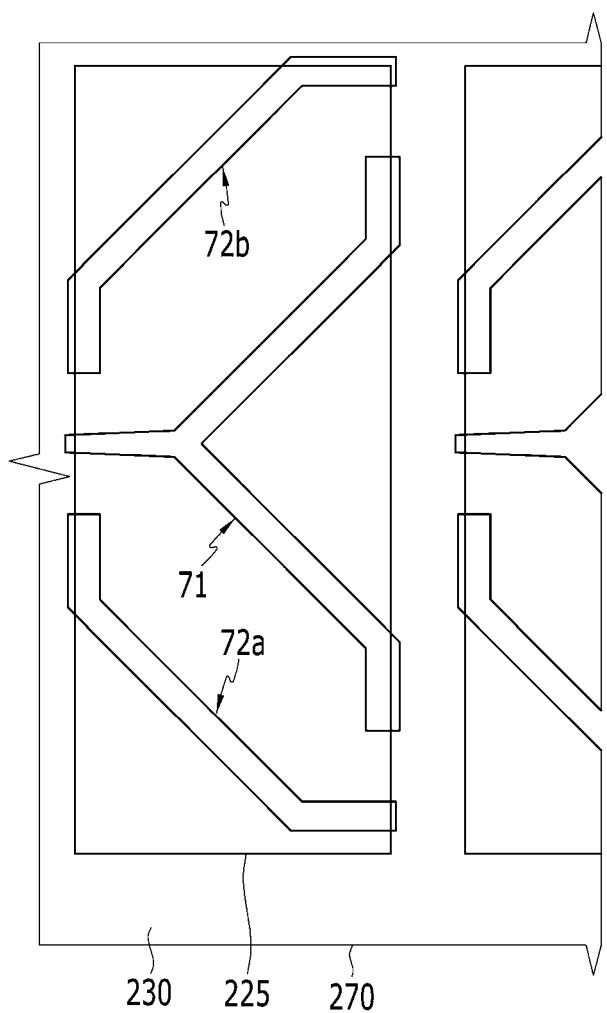
FIG. 3 is a layout view of a common electrode panel for a curved liquid crystal display according to an exemplary embodiment.
Figure 4:
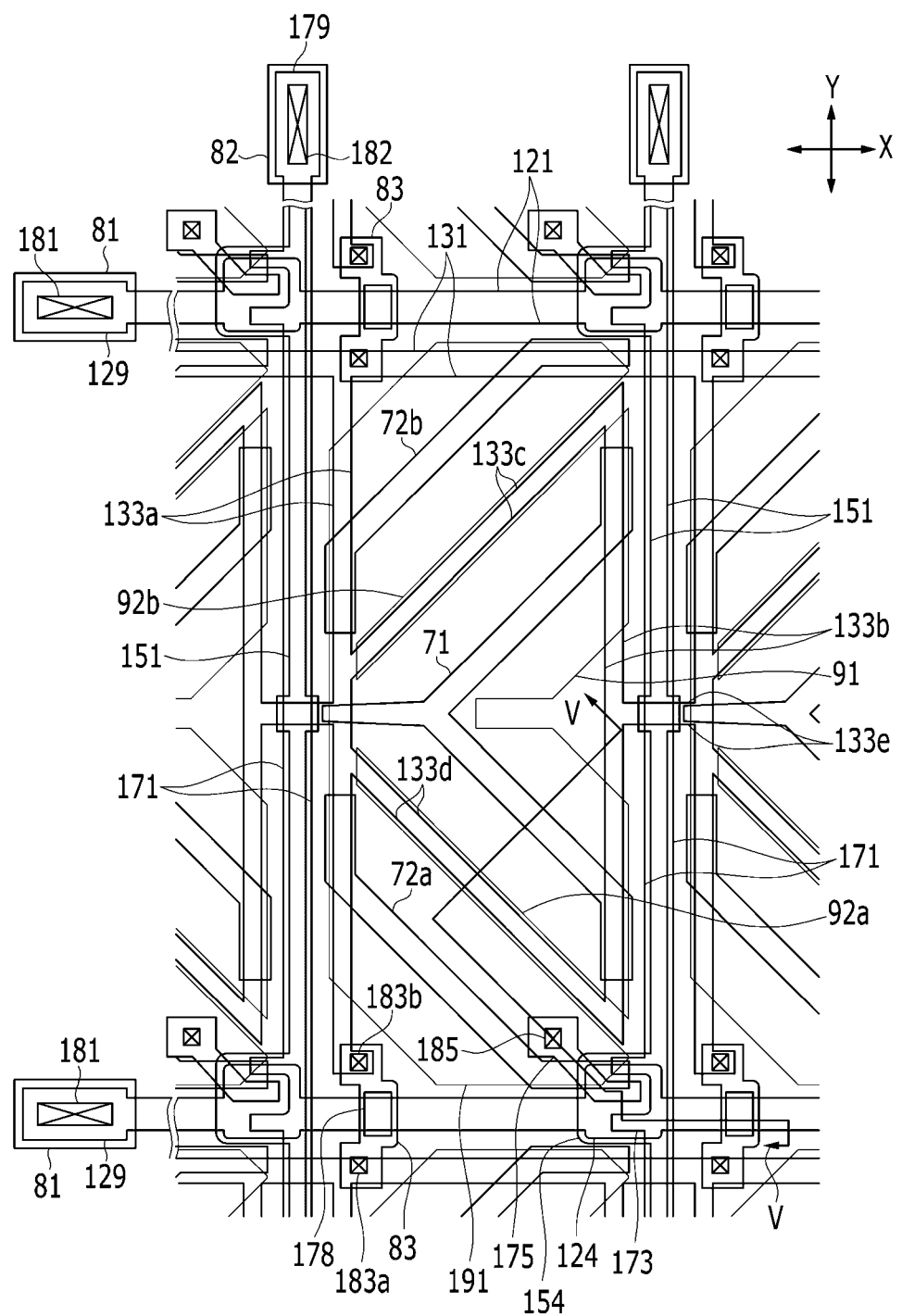
FIG. 4 is a layout view of a curved liquid crystal display in which the thin film transistor array panel of FIG. 2 and the common electrode panel of FIG. 3 are assembled together.

Next, a curved liquid crystal display according to an exemplary embodiment will be described with reference to FIGS. 2, 3, 4, and 5. In FIGS. 2, 3, and 4, although the layout views may appear to depict a flat liquid crystal display, the layout views in fact correspond to a curved liquid crystal display that is curved in the first direction D1 illustrated in FIG. 1.

Figure 5:
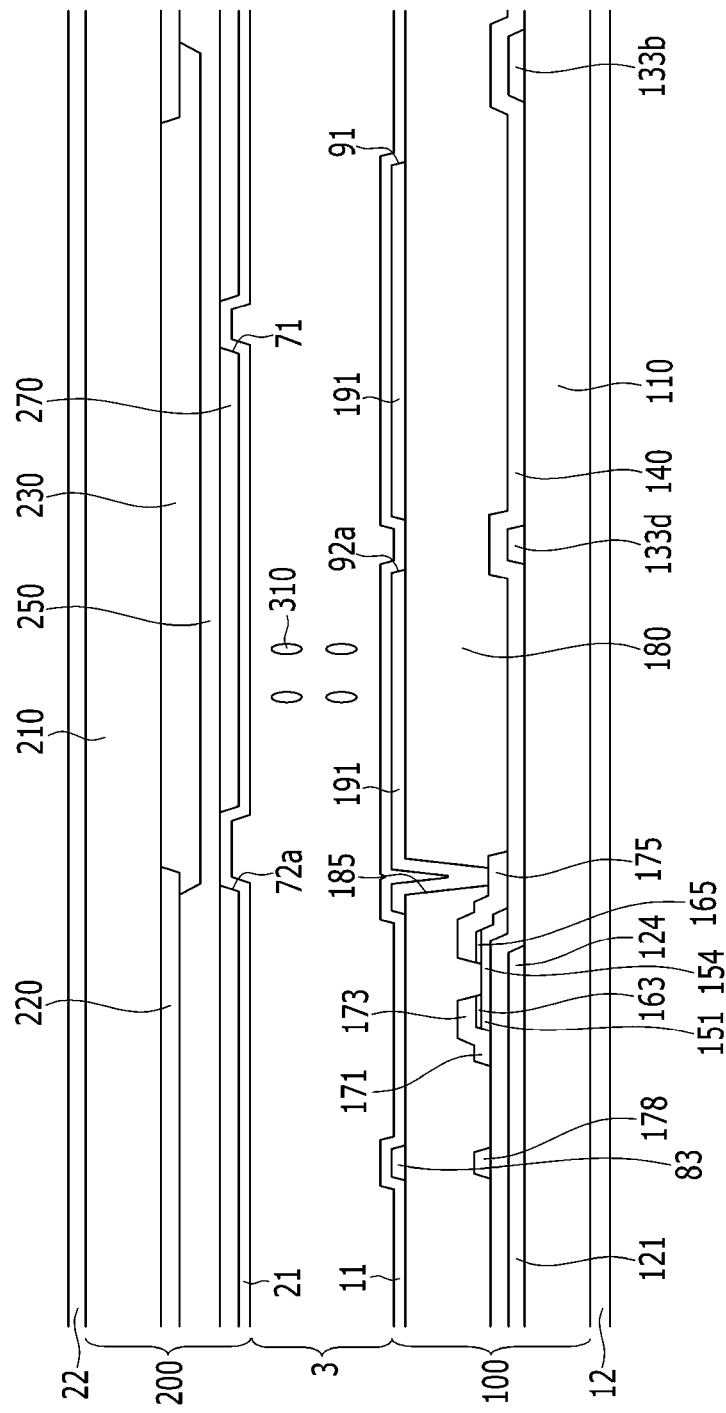
FIG. 5 is a cross-sectional view of the curved liquid crystal display of FIG. 4 taken along line V-V.

FIG. 2 is a layout view of a thin film transistor array panel for the curved liquid crystal display according to the exemplary embodiment, FIG. 3 is a layout view of a common electrode panel for the curved liquid crystal display according to the exemplary embodiment, FIG. 4 is a layout view of the curved liquid crystal display in which the thin film transistor array panel of FIG. 2 and the common electrode panel of FIG. 3 are assembled together, and FIG. 5 is a cross-sectional view of the curved liquid crystal display of FIG. 4 taken along line V-V.

Referring to FIGS. 2, 3, 4, and 5, the curved liquid crystal display includes a thin film transistor array panel 100 and a common electrode panel 200 facing each other, and a liquid crystal layer 3 interposed between the two panels 100 and 200.

First, the thin film transistor array panel 100 will be described as follows.

A gate line 121 and a storage voltage line 131 are formed on an insulation substrate 110. The insulation substrate 110 may be made of transparent glass, plastic, or the like.

The gate line 121 is configured to transfer a gate signal and extends in a substantially horizontal direction. Each gate line 121 includes a plurality of gate electrodes 124 protruding upward and a wide end portion 129 for connecting with other layers or an external driving circuit.

The storage electrode line 131 is configured to receive a predetermined voltage. The storage electrode line 131 includes a stem line extending substantially parallel with the gate line 121, a plurality of first, second, third, and fourth storage electrodes 133a, 133b, 133c, 133d, and a plurality of connection parts 133e. The storage electrodes 133a/133b/133c/133d and the connection parts 133e are divided from the stem line.

The first and second storage electrodes 133a and 133b extend in a substantially vertical direction and face each other. The first storage electrode 133a includes a fixed end connected to the stem line and a free end at an opposite side to the fixed end. The free end includes a projection. The third and fourth storage electrodes 133c and 133d extend obliquely to a lower end and an upper end of the second storage electrode 133b from the center of the first storage electrode 133a. The connection part 133e is connected between adjacent sets of the storage electrodes 133a to 133d. For example, a first connection part 133e is connected between the first storage electrode 133a and the second storage electrode 133, a second connection part 133e is connected between the second storage electrode 133b and the third storage electrode 133c, and a third connection part 133e is connected between the third storage electrode 133c and the fourth storage electrode 133d. It is noted that the shape and layout of the storage electrode line 131 may be modified in other embodiments. In some alternative embodiments, the storage electrode line 131 may be omitted and its storage function replaced by a liquid crystal capacitor.

A gate insulating layer 140 is formed on the gate line 121 and the storage electrode line 131. The gate insulating layer 140 may be made of silicon nitride (SiNx), silicon oxide (SiOx), or the like.

A plurality of semiconductors 151 are formed on the gate insulating layer 140. The semiconductors 151 may be made of hydrogenated amorphous silicon or polysilicon. The semiconductors 151 extend in a substantially vertical direction, and include a plurality of projections 154 protruding toward the gate electrode 124.

A plurality of ohmic contacts are formed on the semiconductors 151. The ohmic contacts may be formed in an island-like configuration. The ohmic contacts may be made of silicide, or a material such as n+ hydrogenated amorphous silicon in which an n-type impurity such as phosphorus is doped at high concentration. The ohmic contacts include a plurality of projections. Each projection and ohmic contact form a pair that is disposed on the projection 154 of the semiconductors 151.

A plurality of data lines 171, a plurality of drain electrodes 175, and a plurality of isolated metal pieces 178 are formed on the ohmic contacts and the gate insulating layer 140.

The data line 171 is configured to transfer a data signal and extends in a substantially vertical direction crossing the gate line 121, the stem line of the storage electrode line 131, and the connection part 133e. Each data line 171 includes a plurality of source electrodes 173 extending toward the gate electrode 124, and a wide end portion 179 for connecting with other layers or an external driving circuit.

The drain electrode 175 is separated from the data line 171, and faces the source electrode 173 with the gate electrode 124 disposed therebetween. Each drain electrode 175 includes a wide end portion and a rod-shaped end portion, with the rod-shaped end portion partially surrounded by the source electrode 173.

The gate electrode 124, the source electrode 173, and the drain electrode 175, together with the projection 154 of the semiconductor 151, collectively constitute a thin film transistor (TFT). A channel of the thin film transistor is positioned in the projection 154 between the source electrode 173 and the drain electrode 175.

The isolated metal pieces 178 are positioned on the gate line 121 around the first storage electrode 133a. The ohmic contacts are positioned between the semiconductors 151, and the data line 171 and the drain electrode 175, to reduce the contact resistance therebetween. Specifically, the ohmic contacts are positioned above the semiconductors 151, and below the data line 171 and the drain electrode 175.

A passivation layer 180 is positioned on the data line 171, the drain electrode 175, the isolated metal piece 178, and the exposed portion of the semiconductors 151.

A plurality of pixel electrodes 191, a plurality of overpasses 83, and a plurality of contact assistants 81 and 82, are formed on the passivation layer 180. The pixel electrodes 191, the overpasses 83, and the contact assistants 81 and 82 may be made of a transparent conductive material such as ITO or IZO, or a reflective metal such as aluminum, silver, chromium, or an alloy thereof.

The pixel electrode 191 is physically and electrically connected with the drain electrode 175 through a contact hole 185, and configured to receive a data voltage from the drain electrode 175. An electric field is generated when the data voltage is applied to the pixel electrode 191 and a common voltage is applied to a common electrode 270 of the common electrode panel 200. The electric field determines the directions of liquid crystal molecules of the liquid crystal layer 3 between the two electrodes 191 and 270. Accordingly, polarization of light passing through the liquid crystal layer 3 varies according to the directions of the liquid crystal molecules determined by the electric field.

The pixel electrode 191 and the common electrode 270 collectively form a liquid crystal capacitor that maintains the applied voltage even after the thin film transistor is turned off. The pixel electrode 191 overlaps with the storage electrode line 131 including the storage electrodes 133a to 133d to form a storage capacitor to increase the charge storage capacity of the liquid crystal capacitor.

Each pixel electrode 191 has four primary sides that are substantially parallel with the gate line 121 or the data line 171, and four corners having a substantially chamfered quadrangular shape. The chamfered oblique side of the pixel electrode 191 forms an angle of about 45° with the gate line 121. A central cutout 91, a lower cutout 92a, and an upper cutout 92b are formed in the pixel electrode 191, such that the pixel electrode 191 is divided into a plurality of partitions by the cutouts 91, 92a, and 92b. The cutouts 91, 92a, and 92b have reverse symmetry with respect to a virtual horizontal centerline bisecting the pixel electrode 191.

The lower and upper cutouts 92a and 92b extend obliquely from the right side to the left side of the pixel electrode 191, and overlap with the third and fourth storage electrodes 133c and 133d, respectively. The lower and upper cutouts 92a and 92b are positioned at a lower half and an upper half with respect to the horizontal centerline of the pixel electrode 191. The lower and upper cutouts 92a and 92b form an angle of about 45° with the gate line 121, and extend perpendicular to each other.

The central cutout 91 extends along the horizontal centerline of the pixel electrode 191 and has an inlet at a right side. The inlet of the central cutout 91 has a pair of oblique sides that are substantially parallel to the lower cutout 92a and the upper cutout 92b, respectively. The central cutout 91 includes a horizontal portion and a pair of oblique portions connected with the horizontal portion. The horizontal portion partially extends along the horizontal centerline of the pixel electrode 191, and the pair of oblique portions extend substantially parallel with the lower cutout 92a and the upper cutout 92b toward the right side of the electrode 191 from the horizontal portion.

Accordingly, the lower half of the pixel electrode 191 is divided into two regions by the lower cutout 92a, and the upper half is also divided into two regions by the upper cutout 92b. It is noted that the number of regions or the number of cutouts may vary according to design considerations such as a size of the pixel electrode 191, a length ratio of the vertical side to the horizontal side of the pixel electrode 191, or a characteristic of the liquid crystal layer 3.

The overpass 83 traverses the gate line 121, and is connected to an exposed portion of the storage electrode line 131 and an exposed end portion of the free end of the first storage electrode 133a through the contact holes 183a and 183b which are positioned at opposite sides to each other with the gate line 121 disposed therebetween. The storage electrode line 131 including the storage electrodes 133a and 133b may be used to repair defects of the gate line 121 or the data line 171, as well as the thin film transistor together with the overpass 83.

The contact assistants 81 and 82 are connected with an end portion 129 of the gate line 121 and an end portion 179 of the data line 171 through the contact holes 181 and 182, respectively. The contact assistants 81 and 82 compensate for adhesion issues between the end portion 129 of the gate line 121 and also the end portion 179 of the data line 171 with an external device. The contact assistants 81 and 82 can also protect the end portion 129 of the gate line 121 and the end portion 179 of the data line 171.

Next, the common electrode panel 200 will be described as follows.

A light blocking member 220 is formed on an insulation substrate 210. The insulation substrate 210 may be made of transparent glass, plastic, or the like. The light blocking member 220 may be referred to as a black matrix, and blocks light leakage between the pixel electrodes 191. The light blocking member 220 includes a plurality of openings 225 facing the pixel electrode 191. Each opening 225 has substantially the same shape as the pixel electrode 191. However, the inventive concept is not limited thereto. In some embodiments, the light blocking members 220 may be formed in a region corresponding to the gate line 121 and the data line 171, and a region corresponding to the thin film transistor.

A plurality of color filters 230 are formed on the insulation substrate 210. The color filters 230 are substantially disposed in an area surrounded by the light blocking member 230 and may be elongated in a vertical direction along the pixel electrode 191 column. Each color filter 230 may display one of three primary colors such as red, green and blue.

An overcoat 250 is formed on the color filter 230 and the light blocking member 220. The overcoat 250 may be made of an (organic) insulator. The overcoat 250 protects the color filter 230 by covering the color filter 230, and provides a flat surface. In some particular embodiments, the overcoat 250 may be omitted.

A common electrode 270 is formed on the overcoat 250. The common electrode 270 is made of a transparent conductor such as ITO and IZO. A plurality of cutouts 71, 72a, and 72b are formed on the common electrode 270 facing the pixel electrode 191.

The cutouts 71, 72a, and 72b include a central cutout 71, a lower cutout 72a, and an upper cutout 72b. Each of the cutouts 71, 72a, and 72b is disposed between adjacent cutouts 91, 92a, and 92b of the pixel electrode 191, or between the cutouts 92a and 92b and the chamfered oblique side of the pixel electrode 191. Further, each of the cutouts 71, 72a, and 72b includes at least one oblique portion extending substantially parallel with the lower cutout 92a or the upper cutout 92b of the pixel electrode 191. The cutouts 71, 72a, and 72b have reverse symmetry with respect to the horizontal centerline of the pixel electrode 191.

Each of the lower and upper cutouts 72a and 72b includes an oblique portion, a horizontal portion, and a vertical portion. The oblique portion extends from the upper side or the lower side to the left side. The horizontal portion and the vertical portion extend along and overlap with the side of the pixel electrode 191 from each end of the oblique portion, and form an obtuse angle with the oblique portion.

The central cutout 71 includes a central horizontal portion, a pair of oblique portions, and a pair of terminal vertical portions. The central horizontal portion extends to the right side along the horizontal centerline of the pixel electrode 191 from the left side of the pixel electrode 191. The pair of oblique portions form an obtuse angle with the central horizontal portion toward the right side of the pixel electrode 191 from the end of the central horizontal portion, and extend substantially parallel with the respective lower and upper cutouts 72a and 72b. The terminal vertical portions extend along and overlap with the right side of the pixel electrode 191 from the end of the corresponding oblique portion, and form an obtuse angle with the oblique portions.

It is noted that the number of cutouts 71, 72a, and 72b are not limited to the above, and may vary according to design considerations. In some embodiments, the light blocking member 220 may overlap with the cutouts 71, 72a, and 72b to block the light leakage near the cutouts 71, 72a, and 72b.

When the common voltage is applied to the common electrode 270 and the data voltage is applied to the pixel electrode 191, an electric field that is substantially perpendicular to the surfaces of the display panels 100 and 200 is generated. The liquid crystal molecules change directions in response to the electric field, such that long axes of the liquid crystal molecules are perpendicular to the direction of the electric field.

The cutouts 71, 72a, and 72b, and 91, 92a, and 92b of the respective field generating electrodes 191 and 270, and the side of the pixel electrode 191, distort the electric field to create horizontal components which determine the tilt directions of the liquid crystal molecules. The horizontal components of the electric field are substantially perpendicular to the sides of the cutouts 71, 72a, and 72b, and 91, 92a, and 92b, and the side of the pixel electrode 191.

Referring to FIG. 3, the cutouts 71, 72a, and 72b, and 91, 92a, and 92b divide the pixel electrode 191 into a plurality of sub-areas, and each sub-area has two primary edges forming an obtuse angle with the primary side of the pixel electrode 191. The primary side of each sub-area forms an angle of about 45° with a polarization axis of polarizers 12 and 22 so as to maximize light efficiency.

The liquid crystal molecules in each sub-area are tilted in directions perpendicular to the primary side, and the tilt directions are approximately in four directions. As such, a reference viewing angle of the liquid crystal display may be increased by varying the tilt directions of the liquid crystal molecules.

It is noted that the shape and the layout of the cutouts 71, 72a, and 72b, and 91, 92a, and 92b are not limited to the above, and may be modified in other embodiments.

In some embodiments (not illustrated), at least one of the cutouts 71, 72a, and 72b, and 91, 92a, and 92b may be replaced with a protrusion or a depression. The protrusion may be made of an organic material or an inorganic material, and may be disposed on or below the electric field generating electrodes 191 and 270.

Alignment layers 11 and 21 are coated on inner surfaces of the display panels 100 and 200. The alignment layers 11 and 21 may be vertical alignment layers.

In some embodiments (not illustrated), the liquid crystal display may further include a retardation film to compensate for the retardation of the liquid crystal layer 3.

The liquid crystal layer 3 includes a plurality of liquid crystal molecules 310. The liquid crystal molecules 310 are aligned such that their long axes are substantially perpendicular to the surfaces of the two display panels 100 and 200 when an electric field is not applied. Accordingly, incident light is blocked and does not pass through crossed polarizers 12 and 22.

Next, a method of manufacturing the curved liquid crystal display according to an embodiment will be described with reference to FIGS. 2, 3, 4, and 5.

The thin film transistor array panel 100 is formed as follows.

First, the gate line 121 including the gate electrode 124 and the end portion 129, and the storage electrode line 131 including the storage electrode 133, are formed by depositing a metal layer on the insulation substrate 110 and etching the metal layer using photolithography.

Next, a plurality of impurity semiconductors 164 and a plurality of semiconductors 151 including projections 154 are formed by sequentially depositing a triple layer structure comprising the gate insulating layer 140, an intrinsic amorphous silicon layer, and an impurity amorphous silicon layer on the gate line 121, the storage electrode line 131, and the insulation substrate 110, and etching the impurity amorphous silicon layer and the intrinsic amorphous silicon layer using photolithography.

Next, the data line 171 including the source electrode 173 and the end portion 179 and the drain electrode 175 are formed by depositing a metal layer on the gate insulating layer 140 and the impurity semiconductor 164, and etching the metal layer using photolithography.

Next, the passivation layer 180 is formed by depositing silicon nitride or silicon oxide on the data line 171, the drain electrode 175, and the exposed portion of the semiconductor 154, using, for example, a plasma-enhanced chemical vapor deposition (PECVD) method.

Next, the plurality of pixel electrodes 191, the plurality of overpasses 83, and the plurality of contact assistants 81 and 82 are formed by depositing and patterning a transparent electrode made of ITO or IZO on the passivation layer 180. The pixel electrode 191 includes the central cutout 91, the lower cutout 92a, and the upper cutout 92b as described above. The pixel electrode 191 may be divided into a plurality of partitions by the cutouts 91, 92a, and 92b.

Next, the alignment layer is coated on the pixel electrode 191, thus completing the forming of the thin film transistor array panel 100.

The common electrode panel 200 is formed as follows.

The plurality of light blocking members 220 separated from each other at predetermined intervals, and the color filters 230 in a region surrounded by the light blocking members 220, are sequentially formed on the insulation substrate 210. Next, the common electrode 270 made of ITO or IZO is formed on the light blocking member 220 and the color filter 230, and the alignment layer 21 is formed on the common electrode 270. The light blocking member 220 may be patterned to include a plurality of openings 225 having substantially the same shape as the pixel electrode 191, and the color filter 230 may be formed elongated in the vertical direction along the pixel electrode 191 column. The common electrode 270 may be patterned to include the plurality of cutouts 71, 72a, and 72b described above.

Subsequently, a flat liquid crystal display is formed by assembling the manufactured thin film transistor array panel 100 and the manufactured common electrode panel 200 together and injecting the liquid crystal therebetween. The flat liquid crystal display may be formed such that the patterns on the thin film transistor array panel 100 and the patterns on the common electrode panel 200 are mismatched.

Figure 6:
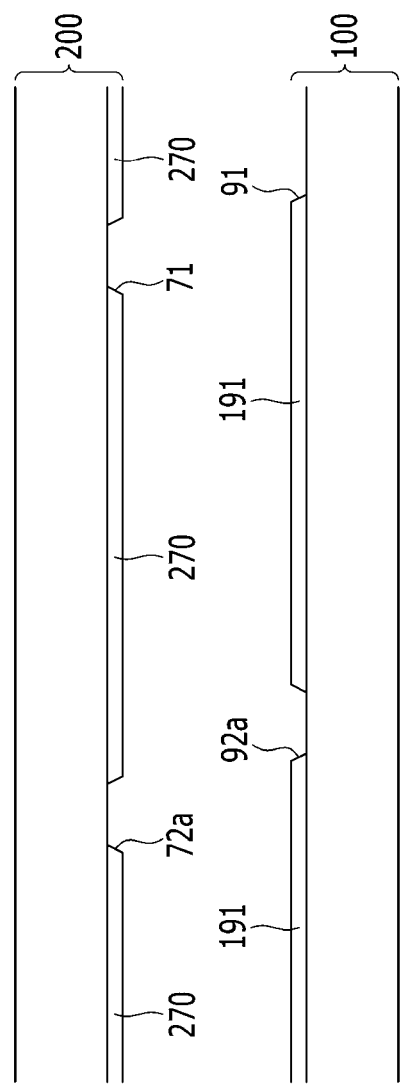
FIGS. 6, 8, and 10 are cross-sectional views illustrating a configuration in which the thin film transistor array panel and the common electrode panel are disposed having a mismatch in a flat liquid crystal display.
Figure 7:
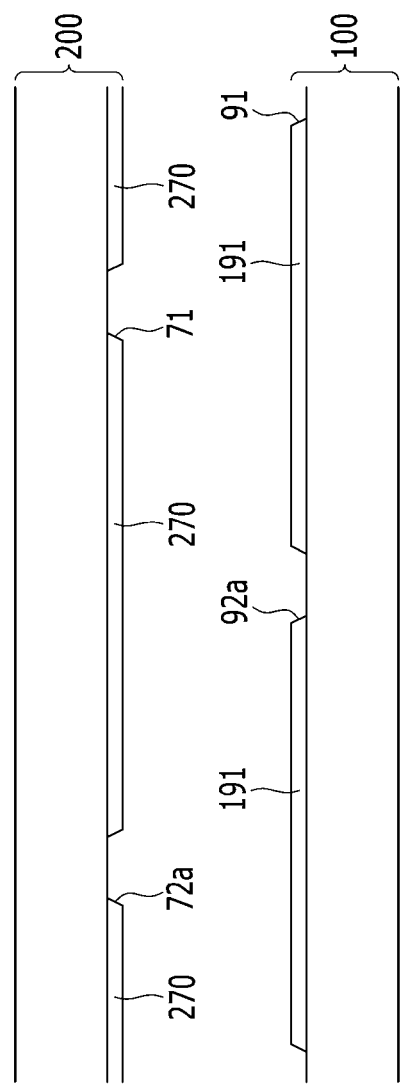
FIGS. 7, 9, and 11 are cross-sectional views illustrating a configuration in which the thin film transistor array panel and the common electrode panel are matched after the flat liquid crystal display of FIGS. 6, 8, and 10 is curved.
Figure 8:
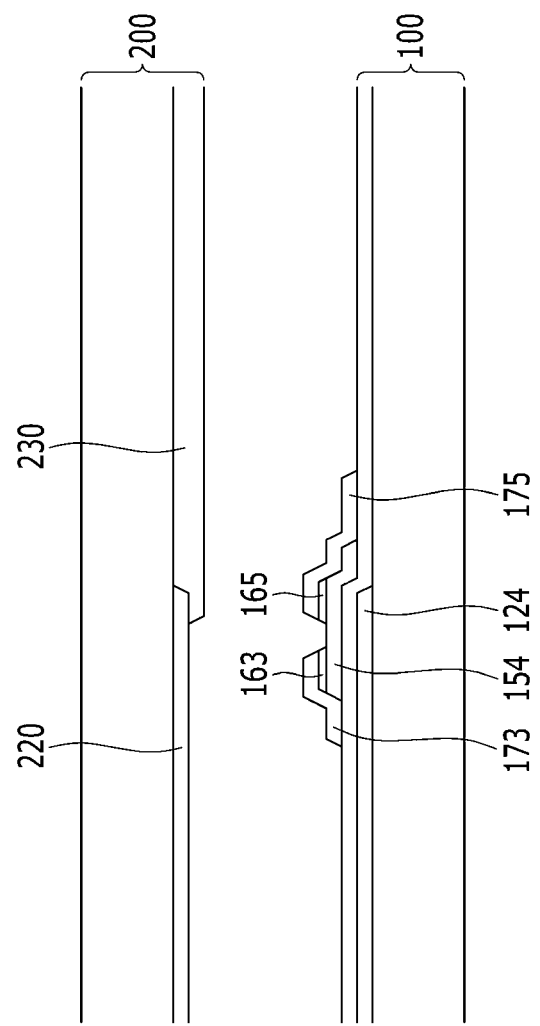
Figure 9:
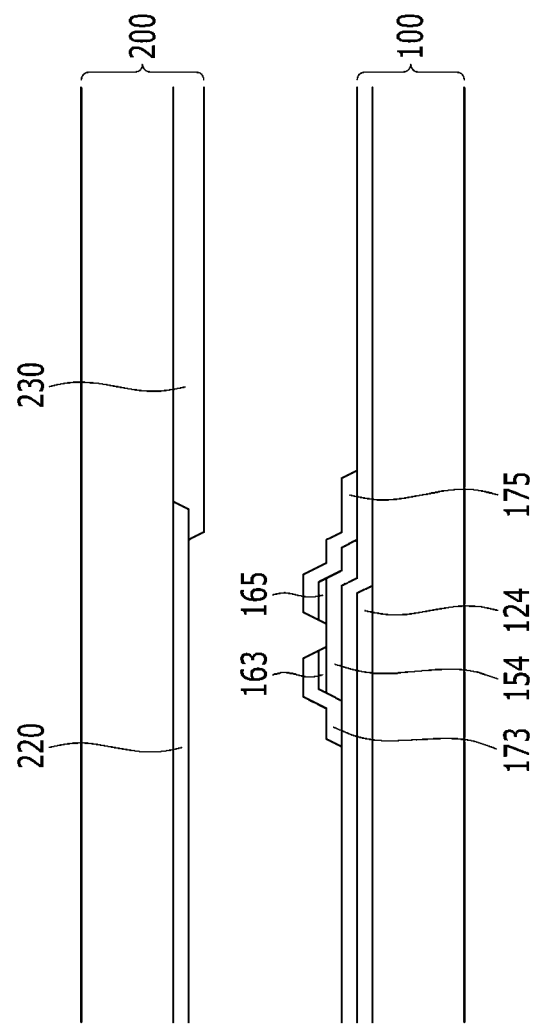
Figure 10:
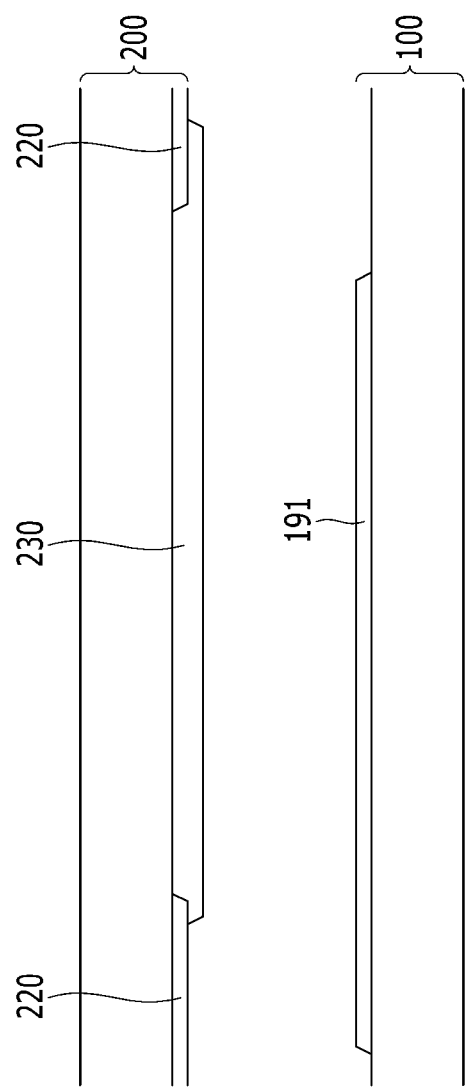
Figure 11:
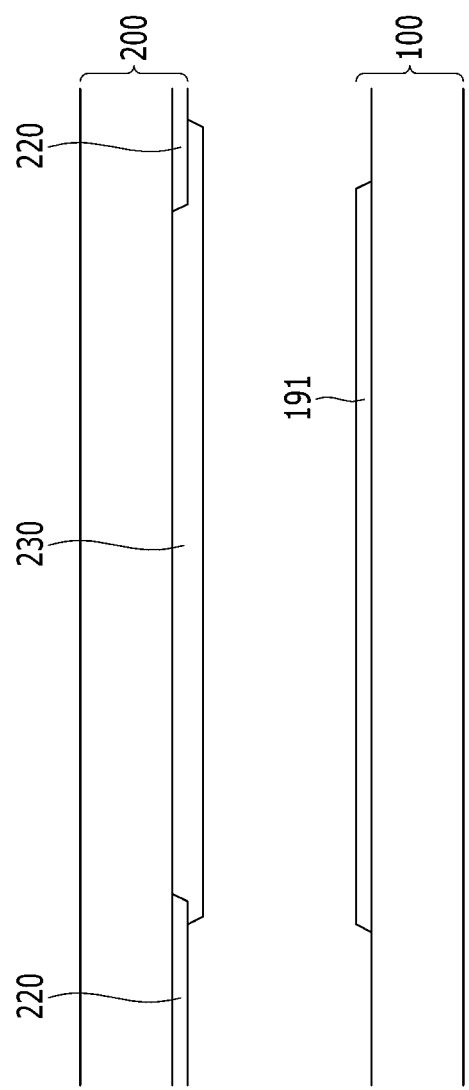

FIGS. 6, 8, and 10 are cross-sectional views illustrating a configuration in which the thin film transistor array panel and the common electrode panel are disposed having a mismatch in the flat liquid crystal display. FIGS. 7, 9, and 11 are cross-sectional views illustrating a configuration in which the thin film transistor array panel and the common electrode panel are matched after the flat liquid crystal display of FIGS. 6, 8, and 10 is curved.

For example, referring to FIG. 6, the cutouts 91 and 92a of the pixel electrode 191 of the thin film transistor array panel 100 may be disposed deviating from the center of the common electrode 270 of the common electrode panel 200, and the cutouts 71 and 72a of the common electrode 270 of the common electrode panel 200 may be disposed deviating from the center of the pixel electrode 191 of the thin film transistor array panel 100. That is, the pixel electrode 191 of the thin film transistor array panel 100 and the common electrode 270 of the common electrode panel 200 may be mismatched.

For example, referring to FIG. 8, the thin film transistor portion of the thin film transistor array panel 100 and the light blocking member 220 portion of the common electrode panel 200 may be misaligned. That is, the thin film transistor portion of the thin film transistor array panel 100 and the light blocking member 220 of the common electrode panel 200 may be mismatched.

For example, referring to FIG. 10, the pixel electrode 191 of the thin film transistor array panel 100 and the color filter 230 of the common electrode panel 200 may be misaligned. That is, the pixel electrode 191 of the thin film transistor array panel 100 and the color filter 230 of the common electrode panel 200 may be mismatched.

Next, the flat liquid crystal display is curved in the first direction of FIG. 1 to form the curved liquid crystal display. The curved liquid crystal display is curved in the first direction, and subsequently, the patterns on the thin film transistor array panel 100 and the patterns on the common electrode panel 200 may be matched with each other.

For example, referring to FIG. 7, after the flat liquid crystal display of FIG. 6 is curved in the first direction, the cutouts 91 and 92a of the pixel electrode 191 of the thin film transistor array panel 100 may be positioned substantially at the center of the common electrode 270 of the common electrode panel 200, and the cutouts 71 and 72a of the common electrode 270 of the common electrode panel 200 may be positioned substantially at the center of the pixel electrode 191 of the thin film transistor array panel 100. That is, the pixel electrode 191 of the thin film transistor array panel 100 and the common electrode 270 of the common electrode panel 200 may be matched in FIG. 7.

For example, referring to FIG. 9, after the flat liquid crystal display of FIG. 8 is curved in the first direction, the thin film transistor portion of the thin film transistor array panel 100 and the light blocking member portion of the common electrode panel 200 may face each other such that they are matched with each other.

For example, referring to FIG. 11, after the flat liquid crystal display of FIG. 10 is curved in the first direction, the pixel electrode 191 of the thin film transistor array panel 100 and the color filter 230 of the common electrode panel 200 may face each other such that they are matched with each other.

As described above, the patterns on the thin film transistor array panel 100 and the patterns on the common electrode panel 200 may be mismatched in the flat liquid crystal display.

Accordingly, after the flat liquid crystal display is curved in the first direction, the patterns on the thin film transistor array panel 100 and the patterns on the common electrode panel 200 may be matched with each other. Since there is no misalignment of the patterns in the curved liquid crystal display, the image quality characteristics of the curved liquid crystal display will not deteriorate. The degree of mismatch of the patterns in the flat liquid crystal display may be determined according to various factors such as a curvature of the curved liquid crystal display, a size of the display panel, a position of the pattern, and/or a thickness of the substrate. Further, the mismatch of the patterns on the thin film transistor array panel 100 and the patterns on the common electrode panel 200 may have symmetry in the first direction.

Next, a curved liquid crystal display according to another exemplary embodiment will be described with reference to FIGS. 12 and 13.

Figure 12:
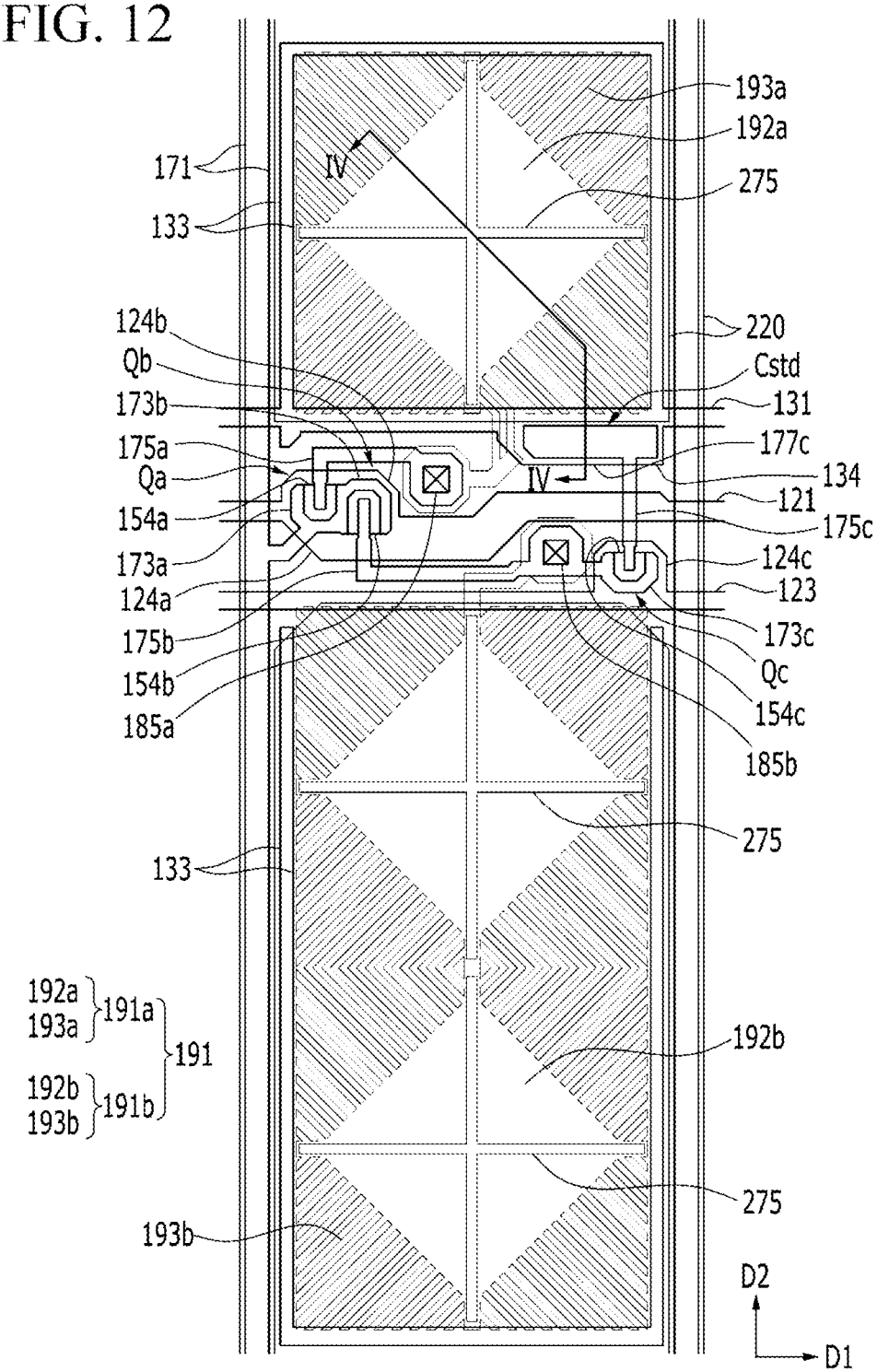
FIG. 12 is a plan view of a pixel of a curved liquid crystal display according to another exemplary embodiment.

FIG. 12 is a plan view of a pixel of a curved liquid crystal display according to the other exemplary embodiment, and FIG. 13 is a cross-sectional view of the pixel of the curved liquid crystal display of FIG. 12 taken along line IV-IV.

Referring to FIGS. 12 and 13, the curved liquid crystal display according to the other exemplary embodiment includes a thin film transistor array panel 100 and a common electrode panel 200 facing each other, and a liquid crystal layer 3 interposed between the two display panels 100 and 200. The curved liquid crystal display may further include a pair of polarizers (not illustrated) attached to outer surfaces of the display panels 100 and 200.

First, the thin film transistor array panel 100 will be described as follows.

A plurality of gate conductors including a plurality of gate lines 121, a plurality of step-down gate lines 123, and a plurality of storage electrode lines 131 are formed on an insulation substrate 110. The insulation substrate 110 may be made of glass, plastic, or the like.

The gate line 121 and the step-down gate line 123 extend in a substantially horizontal direction, and are configured to transfer gate signals. The gate line 121 includes a first gate electrode 124a and a second gate electrode 124b protruding upward and downward respectively, and the step-down gate line 123 includes a third gate electrode 124c protruding upward. The first gate electrode 124a and the second gate electrode 124b are connected to each other to form a projection.

The storage electrode line 131 extends in a substantially horizontal direction, and is configured to transfer a predetermined voltage such as a common voltage Vcom. The storage electrode line 131 includes a storage electrode 133 formed along edges of a first subpixel electrode 191a and a second subpixel electrode 191b. The storage electrode line 131 further includes a capacitive electrode 134 extending downward.

A gate insulating layer 140 is formed on the gate conductors 121, 123, and 131.

A plurality of semiconductors 154a, 154b, and 154c are formed on the gate insulating layer 140. The semiconductors 154a, 154b, and 154c may be made of amorphous silicon, crystalline silicon. or the like. The semiconductors 154a, 154b, and 154c include a first semiconductor 154a positioned on the first gate electrode 124a, a second semiconductor 154b positioned on the second gate electrode 124b, and a third semiconductor 154c positioned on the third gate electrode 124c. The first semiconductor 154a may also be positioned below the data line 171, and the third semiconductor 154c may also be positioned on the capacitive electrode 134.

A plurality of ohmic contacts (not illustrated) may be further formed on the semiconductors 154a, 154b, and 154c. A first ohmic contact, a second ohmic contact, and a third ohmic contact may be formed on the first semiconductor 154a, the second semiconductor 154b, and the third semiconductor 154c, respectively.

Data conductors are formed on the semiconductors 154a, 154b, and 154c. The data conductors include a plurality of data lines 171, a plurality of first drain electrodes 175a, a plurality of second drain electrodes 175b, and a plurality of third drain electrodes 175c.

The data lines 171 are configured to transfer data signals, and extend in a substantially vertical direction crossing the gate lines 121 and the step-down gate lines 123. Each data line 171 includes a first source electrode 173a and a second source electrode 173b connected to each other and extending toward the first gate electrode 124a and the second gate electrode 124b, respectively.

Each of the first drain electrode 175a, the second drain electrode 175b, and the third drain electrode 175c includes a wide end portion and a rod-shaped end portion. The rod-shaped end portions of the first drain electrode 175a and the second drain electrode 175b are partially surrounded by the first source electrode 173a and the second source electrode 173b. The wide end portion of the second drain electrode 175b extends to form a third source electrode 173c which is bent in the shape of a letter 'U'. A wide end portion 177c of the third drain electrode 175c overlaps with the capacitive electrode 134 to form a step-down capacitor Cstd, and the rod-shaped end portion of the third drain electrode 175c is partially surrounded by the third source electrode 173c.

The first/second/third gate electrodes 124a/124b/124c, the first/second/third source electrodes 173a/173b/173c, and the first/second/third drain electrodes 175a/175b/175c, together with the first/second/third semiconductors 154a/154b/154c, collectively constitute first/second/third thin film transistors Qa/Qb/Qc, respectively. A channel of each of the thin film transistors Qa/Qb/Qc is formed in each of the semiconductors 154a/154b/154c between each of the source electrodes 173a/173b/173c and each of the drain electrodes 175a/175b/175c, respectively.

The semiconductors 154a, 154b, and 154c have substantially the same planar shape as the data conductors 171, 175a, 175b, and 175c except for the channel regions between the source electrodes 173a/173b/173c and the drain electrodes 175a/175b/175c. That is, the semiconductors 154a, 154b, and 154c have exposed portions that are not covered by the data conductors 171, 175a, 175b, and 175c between the source electrodes 173a/173b/173c and the drain electrodes 175a/175b/175c.

A lower passivation layer 180p is formed on the data conductors 171, 175a, 175b, and 175c, and on the exposed portion of the semiconductors 154a, 154b, and 154c. The lower passivation layer 180p may be made of an inorganic insulator such as silicon nitride or silicon oxide. In some particular embodiments, the lower passivation layer 180p may be omitted.

Color filters 230 are positioned on the lower passivation layer 180p. Each color filter 230 is elongated in a vertical direction along a space between adjacent data lines 171. Each color filter 230 may display one of primary colors (such as one of the three primary colors red, green and blue). The color filters 230 may overlap with each other on the data line 171. In the embodiment of FIGS. 12 and 13, the color filters 230 are formed on the thin film transistor array panel 100, but the inventive concept is not limited thereto. In some other embodiments, the color filters 230 may be formed on the common electrode panel 200 instead of the thin film transistor array panel 100.

An upper passivation layer 180q is formed on the color filter 230. The upper passivation layer 180q may prevent the color filter 230 from lifting off. The upper passivation layer 180q may also prevent defects (such as an afterimage which may be caused when a screen is being driven) from occurring. Specifically, the above defects can be prevented by protecting the liquid crystal layer 3 from being contaminated by an organic material (such as a solvent from the color filter 230 flowing onto the liquid crystal layer 3). The passivation layer 180q may be made of an inorganic insulating material (such as silicon nitride or silicon oxide) or an organic material. In some particular embodiments, the upper passivation layer 180*q* may be omitted.

A plurality of first contact holes 185*a* and a plurality of second contact holes 185*b* are formed in the lower passivation layer 180*p*, the color filter 230, and the upper passivation layer 180*q*. The first contact holes 185*a* and the second contact holes 185*b* expose the wide end portion of the first drain electrode 175*a* and the wide end portion of the second drain electrode 175*b*, respectively.

A plurality of pixel electrodes 191 are formed on the upper passivation layer 180*q*. Each pixel electrode 191 includes the first subpixel electrode 191*a* and the second subpixel electrode 191*b* separated from each other with the gate lines 121 and 123 disposed therebetween. The first subpixel electrode 191*a* and the second subpixel electrode 191*b* are disposed above and below a pixel area, respectively, and are adjacent to each other in a column direction. The first subpixel electrode 191*a* is connected with the first drain electrode 175*a* through the first contact hole 185*a*. The second subpixel electrode 191*b* is connected with the second drain electrode 175*b* through the second contact hole 185*b*.

The first subpixel electrode 191*a* and the second subpixel electrode 191*b* include partial plate electrodes 192*a* and 192*b* and a plurality of minute branch electrodes 193*a* and 193*b* extending from the respective partial plate electrodes 192*a* and 192*b*.

Specifically, the first subpixel electrode 191*a* includes a first partial plate electrode 192*a* and a first minute branch electrode 193*a* extending from the first partial plate electrode 192*a*. The first partial plate electrode 192*a* has a rhombus shape. A horizontal diagonal line having a rhombus shape is parallel with the first direction D1. The first direction D1 corresponds to a curvature direction of the curved liquid crystal display 1000. A vertical diagonal line having a rhombus shape is orthogonal to the first direction D1. That is, the vertical diagonal line having a rhombus shape is parallel with a second direction D2 that is perpendicular to the first direction D1. The first minute branch electrode 193*a* extends to form an angle of about 90° with each side of the rhombus shape.

The second subpixel electrode 191*b* includes a second partial plate electrode 192*b* and a second minute branch electrode 193*b* extending from the second partial plate electrode 192*b*. The second partial plate electrode 192*b* has a rhombus shape. A horizontal diagonal line having a rhombus shape is parallel with the first direction D1. As previously described, the first direction D1 corresponds to the curvature direction of the curved liquid crystal display 1000. A vertical diagonal line having a rhombus shape is orthogonal to the first direction D1. That is, the vertical diagonal line having a rhombus shape is parallel with the second direction D2 that is perpendicular to the first direction D1. The first minute branch electrode 193*a* extends to form an angle of about 90° with each side of the rhombus shape.

In the embodiment of FIG. 12, the first subpixel electrode 191*a* includes one first partial plate electrode 192*a* and the first minute branch electrode 193*a* extending from the first partial plate electrode 192*a*. However, the inventive concept is not limited thereto. In some other embodiments, the first subpixel electrode 191*a* may include one or more first partial plate electrodes 192*a* and first minute branch electrodes 193*a* extending from the first partial plate electrodes 192*a*.

In the embodiment of FIG. 12, the second subpixel electrode 191*b* includes two second partial plate electrodes 192*b* and the second minute branch electrode 193*b* extending from the second partial plate electrodes 192*b*. However, the inventive concept is not limited thereto. In some other embodiments, the second subpixel electrode 191*b* may include one second partial plate electrodes 192*b* and the second minute branch electrode 193*b* extending from the second partial plate electrode 192*b*. In some further embodiments, the second subpixel electrode 191*b* may include three or more second partial plate electrodes 192*b* and the second minute branch electrodes 193*b* extending from the second partial plate electrodes 192*b*.

The first subpixel electrode 191*a* and the second subpixel electrode 191*b* are configured to receive data voltages from the first drain electrode 175*a* and the second drain electrode 175*b*, respectively. An electric field is generated by applying the data voltages to the first subpixel electrode 191*a* and the second subpixel electrode 191*b* and the common voltage to the common electrode 270 of the common electrode panel 200. The electric field determines the directions of the liquid crystal molecules of the liquid crystal layer 3 between the two electrodes 191 and 270. Polarization of light passing through the liquid crystal layer 3 varies according to the directions of the liquid crystal molecules determined by the electric field.

The first subpixel electrode 191*a* and the common electrode 270 form a first liquid crystal capacitor Clca with the liquid crystal layer 3 disposed therebetween, and the second subpixel electrode 191*b* and the common electrode 270 form a second liquid crystal capacitor Clcb with the liquid crystal layer 3 disposed therebetween. As a result, the applied voltages are maintained even after the first and second thin film transistors Qa and Qb have been turned off.

The first and second subpixel electrodes 191*a* and 191*b* overlap with the storage electrode line 131 including the storage electrode 133 to form first and second storage capacitors Csta and Cstb, respectively. The first and second storage capacitors Csta and Cstb serve to increase the charge storage capacity of the first and second liquid crystal capacitors Clca and Clcb.

The capacitor electrode 134 and the wide end portion 177*c* of the third drain electrode 175*c* overlap with each other with the gate insulating layer 140 disposed therebetween to form the step-down capacitor Cstd.

A lower alignment layer (not illustrated) may be formed on the pixel electrode 191 and the exposed upper passivation layer 180*q*. The lower alignment layer may be a vertical alignment layer and may be an alignment layer including a photoreactive material.

Next, the common electrode panel 200 will be described as follows.

A light blocking member 220 is positioned on an insulation substrate 210. The insulation substrate 210 may be made of glass, plastic, or the like. The light blocking member 220 is referred to as a black matrix and may block light leakage. The light blocking member 220 extends along the gate line 121 and the step-down gate line 123 in an up-down configuration, and covers a region in which the first thin film transistor Qa, the second thin film transistor Qb, and the third thin film transistor Qc are positioned. The light blocking member 220 also extends along the data line 171 and covers the periphery of the data line 171. A region that is not covered by the light blocking member 220 corresponds to a light-emitting region for displaying an image.

A planarization layer 250 is formed on the light blocking member 220. The planarization layer 250 may be made of an organic material and provides a planar surface. In the embodiment of FIG. 13, the light blocking member 220 is formed on the common electrode panel 200, but the inventive concept is not limited thereto. In some other embodiments, the light blocking member 220 may be formed on the thin film transistor array panel 100 instead of the common electrode panel 200.

A common electrode 270 is formed on the planarization layer 250. The common electrode 270 may be made of a transparent conductive material. A cutout 275 is formed in the common electrode 270. The cutout 275 may have a cross shape and extend in both a vertical direction and a horizontal direction.

The cutout 275 of the common electrode 270 overlaps with the pixel electrode 191. The cutout 275 overlaps with the partial plate electrodes 192a and 192b of the pixel electrode 191. Specifically, the cutout 275 overlaps with the central portions of the partial plate electrodes 192a and 192b of the pixel electrode 191. The partial plate electrodes 192a and 192b have a rhombus shape, and the cutout 275 overlaps with horizontal and vertical diagonal lines having a rhombus shape.

An upper alignment layer (not illustrated) may be formed on the common electrode 270. The upper alignment layer may be a vertical alignment layer. The upper alignment layer may also be an alignment layer including a photo-polymerization material that can be photo-aligned.

Polarizers (not illustrated) may be provided on the outer surfaces of the two panels 100 and 200. Transmissive axes of the two polarizers are perpendicular to each other, and the transmissive axis of one of the two polarizers may be parallel to the gate line 121. In some alternative embodiments, the polarizer may be disposed on the outer surface of only one of the two display panels 100 and 200.

The liquid crystal layer 3 may have negative dielectric anisotropy, and the liquid crystal molecules of the liquid crystal layer 3 may be aligned such that long axes of the liquid crystal molecules are perpendicular to the surfaces of the two display panels 100 and 200 when an electric field is not applied.

As described above, the electric field is generated by applying the data voltages to the first subpixel electrode 191a and the second subpixel electrode 191b and the common voltage to the common electrode 270 of the common electrode panel 200. As a result, the liquid crystal molecules of the liquid crystal layer 3 are tilted in a horizontal direction relative to the surfaces of the two electrodes 191 and 270, and luminance of light passing through the liquid crystal layer 3 varies according to the degree of tilt of the liquid crystal molecules.

Next, a method of manufacturing the curved liquid crystal display of FIGS. 12 and 13 will be described.

The thin film transistor array panel 100 is formed as follows.

First, the gate line 121, the step-down gate line 123, and the storage electrode line 131 are formed by depositing a metal layer on the insulation substrate 110 and etching the metal layer using photolithography.

Next, a plurality of ohmic contacts and semiconductors 154a, 154b, and 154c are formed by sequentially depositing a triple layer structure comprising the gate insulating layer 140, the intrinsic amorphous silicon layer, and the impurity amorphous silicon layer on the gate line 121, the step-down gate line 123, the storage electrode line 131, and the insulation substrate 110, and etching the impurity amorphous silicon layer and the intrinsic amorphous silicon layer using photolithography.

Next, the data line 171, the first drain electrode 175a, the second drain electrode 175b, and the third drain electrode 175c are formed by depositing a metal layer on the gate insulating layer 140 and the ohmic contacts, and etching the metal layer using photolithography.

Next, the lower passivation layer 180p, the color filter 230, and the upper passivation layer 180q are sequentially deposited on the data line 171, the first drain electrode 175a, the second drain electrode 175b, the third drain electrode 175c, and the exposed portion of the semiconductors 154a, 154b, and 154c.

Next, a plurality of pixel electrodes 191 are formed by depositing and patterning a transparent electrode made of ITO or IZO on the upper passivation layer 180q. As described above, the pixel electrode 191 includes the first subpixel electrode 191a and the second subpixel electrode 191b. The first subpixel electrode 191a and the second subpixel electrode 191b include the partial plate electrodes 192a and 192b and the plurality of minute branch electrodes 193a and 193b extending from the partial plate electrodes 192a and 192b, respectively.

Next, the alignment layer is coated on the pixel electrode 191, thereby forming the thin film transistor array panel 100.

The common electrode panel 200 is formed as follows.

First, the plurality of light blocking members 220 and the planarization layer 250 are sequentially formed on the insulation substrate 210. The plurality of light blocking members 220 are separated from each other at predetermined intervals. Next, the common electrode 270 made of ITO or IZO is formed on the planarization layer 250, and the alignment layer is formed thereon. The common electrode 270 may be patterned to include the plurality of cutouts 275 described above. The cutouts 275 of the common electrode 270 overlap with the partial plate electrodes 192a and 192b of the pixel electrode 191. The partial plate electrodes 192a and 192b have a rhombus shape, and the cutouts 275 overlap with horizontal and vertical diagonal lines having a rhombus shape.

Next, the alignment layer is coated on the common electrode 270, thus completing the forming of the common electrode panel 200.

Next, the flat liquid crystal display is formed by assembling the thin film transistor array panel 100 and the common electrode panel 200 together and injecting the liquid crystal therebetween. The flat liquid crystal display may be formed such that patterns on the thin film transistor array panel 100 and patterns on the common electrode panel 200 are mismatched.

Next, the flat liquid crystal display is curved in the first direction to form the curved liquid crystal display. Specifically, the curved liquid crystal display is curved in the first direction so that the patterns on the thin film transistor array panel 100 and the patterns on the common electrode panel 200 may be matched with each other.

As previously described, the patterns on the thin film transistor array panel 100 and the patterns on the common electrode panel 200 may be mismatched in the flat liquid crystal display.

Accordingly, after the flat liquid crystal display is curved in the first direction, the patterns on the thin film transistor array panel 100 and the patterns on the common electrode panel 200 may be matched with each other. Since there is no misalignment of the patterns in the curved liquid crystal display, the image quality characteristics of the curved liquid crystal display will not deteriorate. The degree of mismatch of the patterns in the flat liquid crystal display may be determined according to various factors such as a curvature of the curved liquid crystal display, a size of the display panel, a position of the pattern, and/or a thickness of the substrate. Further, the mismatch of the patterns on the thin film transistor array panel 100 and the patterns on the common electrode panel 200 may have symmetry in the first direction.

While the inventive concept has been described in connection with what is presently considered to be exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A method of manufacturing a curved liquid crystal display, comprising:
   forming a first display panel including a pixel electrode having a plurality of partitions that are disposed to be connected to each other and divided by a plurality of first cutouts in a plan view;
   forming a second display panel including a common electrode having a plurality of partitions divided by a plurality of second cutouts including an upper cutout, a lower cutout, and a central cutout, wherein the plurality of second cutouts are disposed between adjacent first cutouts of the plurality of first cutouts, the upper cutout, the lower cutout, and the central cutout are separated from each other in a plane view, and the upper cutout and the lower cutout are symmetric with each other with respect to the central cutout;
   forming, on the first display panel, a storage electrode line including one or more storage electrodes that extend along and overlap at least partially one of the plurality of first cutouts;
   assembling the first display panel and the second display panel;
   filling liquid crystal molecules between the assembled first and second display panels to form a flat liquid crystal display; and
   curving an assembly of the flat liquid crystal display filled with the liquid crystal molecules in a first direction to form the curved liquid crystal display,
   wherein the partitions of the pixel electrode overlap the second cutouts of the common electrode, and the second cutouts are misaligned from a center of the partitions of the pixel electrode in the flat liquid crystal display, and the partitions of the common electrode overlap the first cutouts of the pixel electrode, and the first cutouts are misaligned from a center of the partitions of the common electrode in the flat liquid crystal display,
   wherein the first cutouts are positioned substantially at the center of the common electrode after the flat liquid crystal display is curved into the curved liquid crystal display, and the second cutouts are positioned substantially at the center of the pixel electrode after the flat liquid crystal display is curved into the curved liquid crystal display.

2. The method of claim 1, wherein the pixel electrode includes a partial plate electrode and a plurality of minute branch electrodes extending from the partial plate electrode, and
   wherein the partial plate electrode overlaps with the cutouts of the common electrode when the flat liquid crystal display is curved in the first direction to form the curved liquid crystal display.

3. The method of claim 1, further comprising aligning a thin film transistor and a light blocking member when curving the assembly of the flat liquid crystal display into the curved liquid crystal display.

4. The method of claim 1, further comprising aligning a color filter and the pixel electrode and the common electrode when curving the assembly of the flat liquid crystal display into the curved liquid crystal display.

5. The method of claim 1, wherein the first cutouts and the second cutouts distort an electric field formed between the pixel electrode and the common electrode and create horizontal components of the electric field that determine tilt directions of the liquid crystal molecules.

6. A curved liquid crystal display comprising:
   a first display panel including a pixel electrode having a plurality of partitions that are disposed to be connected to each other and divided by a plurality of first cutouts in a plan view;
   a second display panel including a common electrode having a plurality of partitions divided by a plurality of second cutouts including an upper cutout, a lower cutout, and a central cutout that face the plurality of first cutouts, wherein the plurality of second cutouts are disposed between adjacent first cutouts, the upper cutout, the lower cutout, and the central cutout are separated from each other in a plane view, and the upper cutout and the lower cutout are symmetric with each other with respect to the central cutout; and
   a liquid crystal layer including liquid crystal molecules and positioned between the first display panel and the second display panel so as to form a flat liquid crystal display,
   wherein the first display panel further includes a storage electrode line including one or more storage electrodes that extend along and overlap at least partially one of the plurality of first cutouts,
   wherein the partitions of the pixel electrode overlap the second cutouts of the common electrode, and the second cutouts are misaligned from a center of the partitions of the pixel electrode in the flat liquid crystal display, and the partitions of the common electrode overlap the first cutouts of the pixel electrode, and the first cutouts are misaligned from a center of the partitions of the common electrode in the flat liquid crystal display,
   wherein the first cutouts are positioned substantially at the center of the common electrode after the flat liquid crystal display is curved into the curved liquid crystal display, and the second cutouts are positioned substantially at the center of the pixel electrode after the flat liquid crystal display is curved into the curved liquid crystal display in a first direction, and
   wherein a degree of the mismatch between the first cutouts and the second cutouts in the flat liquid crystal display is determined by a curvature of the curved liquid crystal display, and is further determined by at least one of a size of the first display panel and the second display panel, a first position of the first cutouts and a second position of the second cutouts, and a thickness of the substrate.

7. The curved liquid crystal display of claim 6, wherein:
   the pixel electrode includes a partial plate electrode and a plurality of minute branch electrodes extending from the partial plate electrode, and
   the partial plate electrode overlaps with the cutouts of the common electrode when the flat liquid crystal display is curved in the first direction to form the curved liquid crystal display.

8. The curved liquid crystal display of claim 6 further comprising a thin film transistor and a light blocking member, wherein the thin film transistor and the light blocking member are aligned when curving the assembly of the flat liquid crystal display into the curved liquid crystal display.

9. The curved liquid crystal display of claim 6 further comprising a color filter, wherein the color filter is aligned with the pixel electrode and the common electrode when curving the assembly of the flat liquid crystal display into the curved liquid crystal display.

10. The curved liquid crystal display of claim 6, wherein the first cutouts and the second cutouts are mismatched having symmetry in the first direction.

11. The curved liquid crystal display of claim 6, wherein the first cutouts and the second cutouts distort an electric field formed between the pixel electrode and the common electrode and create horizontal components of the electric field that determine tilt directions of the liquid crystal molecules.

* * * * *